Patented Nov. 14, 1922.

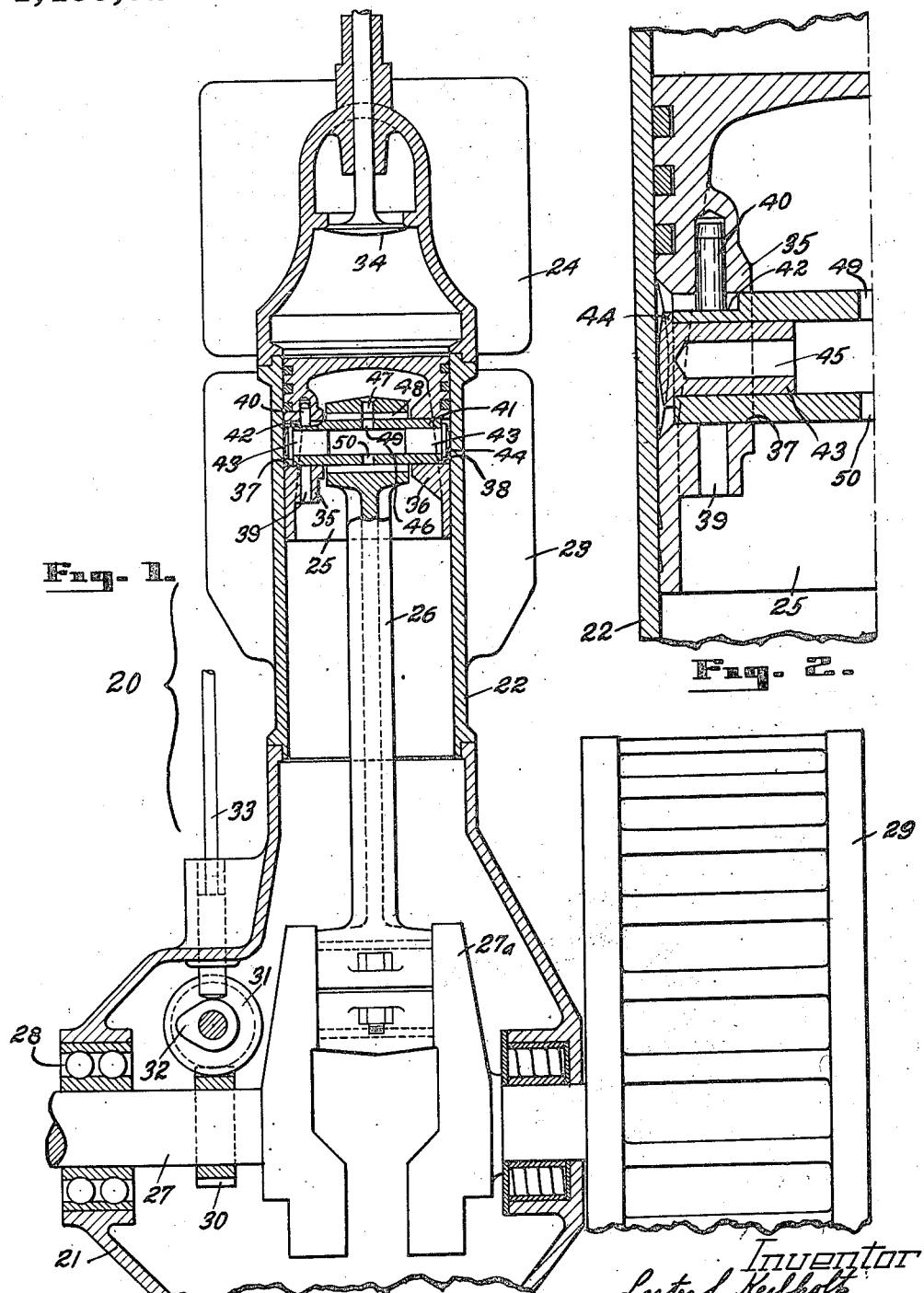

1,435,528

UNITED STATES PATENT OFFICE.

LESTER S. KEILHOLTZ, OF DAYTON, OHIO, ASSIGNOR, BY MESNE ASSIGNMENTS, TO DELCO-LIGHT COMPANY, OF DAYTON, OHIO, A CORPORATION OF DELAWARE.

ENGINE.

Application filed May 19, 1919. Serial No. 298,119.

*To all whom it may concern:*

Be it known that I, LESTER S. KEILHOLTZ, a citizen of the United States of America, residing at Dayton, county of Montgomery, State of Ohio, have invented certain new and useful Improvements in Engines, of which the following is a full, clear, and exact description.

This invention relates to cylinder and piston construction and particularly to means for retaining the piston pin in place in the piston.

Heretofore it has been the usual practice to secure the piston pin to either the piston or connecting rod to prevent it from rubbing against the cylinder during reciprocation of the piston.

It is an object of the present invention to provide a cylinder and piston construction in which the piston pin is not positively locked in position in the piston before the piston is placed in the cylinder but is partly held in position by the cylinder walls.

It is a further object of the present invention to provide means secured in the ends of the piston pin to cooperate with the cylinder walls to prevent endwise movement of the piston pin.

In carrying out the foregoing objects it is a further object of the invention to prevent the piston pin from turning while permitting endwise movement of the pin, so that in case the piston is removed from the cylinder the piston pin may be immediately withdrawn without first loosening any securing device.

Still another object of the invention is to provide an oil reservoir within the piston pin whereby lubricant may be retained and distributed to the working surfaces.

Other and further objects and advantages of the present invention will be apparent from the following description, reference being had to the accompanying drawings, wherein a preferred embodiment of the present invention is clearly shown.

In the drawings:

Fig. 1 is a longitudinal sectional view of an internal-combustion engine showing the piston and piston pin in section; and Fig. 2 is an enlarged sectional view of a portion of the cylinder and piston showing the piston and piston pin construction.

In the drawings, an internal-combustion engine 20 is provided with a crank case 21 and a cylinder 22 mounted upon the crank case and provided with cooling fins 23. A cylinder head 24 is mounted upon the cylinder 22. A piston 25 slides within the cylinder 22 and is connected by a connecting rod 26 to the crank arm 27ª of the crank shaft 27. Crank shaft 27 is journaled upon bearing 28 and carries a fly-wheel 29 and a gear 30, which co-operates with the timing gear 31. Gear 31 drives the valve cam 32 which cooperates with the push rod 33 which in turn operates valve 34 by a suitable mechanism.

The piston 25 is provided with aligned bosses 35 and 36 having aligned apertures 37 and 38. The boss 35 is provided with a hole 39 adapted to contain a locating pin 40. A hollow piston pin 41 is provided with a groove 42 open at one end, and when assembled locating pin 40 projects into the groove 42. End plugs 43 of relatively soft material such as aluminum are each provided with a head 44 and with a hollow shank 45. The outside diameter of the shank is slightly larger than the inside diameter of the hollow piston pin, so that when the plugs are driven into the hollow piston pin the shank portion will tend to contract and to be clinched inside of the hollow piston pin. The enlarged portion or head 44 has a spherical outer surface having a radius preferably equal to the radius of the bore of the cylinder. In this manner there will be but a line of contact between the plug and the cylinder wall.

An oil reservoir 46 is provided within said hollow piston pin when the end plugs 43 are placed in the position described. A hole 47 is provided in the connecting rod 26 and bearing 48, said hole being in alignment with holes 49 and 50 drilled through the piston pin 41. The holes 47 and 49 provide an inlet to the oil reservoir 46, while hole 50 provides an outlet from said reservoir. A quantity of oil will be thrown upwardly from the crank case by means of the crank arm 27ª or other suitable means. A portion of this oil will enter through said holes 47 and 49 into the oil reservoir 46, and will be distributed to the bearing 48 by means of the outlet hole 50. Locating pin 40 in the boss 35 of the piston projects into the groove 42 and maintains the holes of the piston pin 49 in alignment with the holes 47 in the connecting rod 26 and bearing 48.

In assembling the piston and its parts, the locating pin is first put in position as shown and the piston pin is inserted endwise through the aperture 38, the groove 42 sliding over and engaging with the locating pin 40. The locating pin 40 cooperating with the groove 42 effectively holds the piston pin against rotation but it does not prevent endwise movement of the piston pin in its bearings. Such movement is largely prevented by making a tight fit between the piston pin and its bearings such as is commonly known as a "drive fit", and which may be obtained by forcing the piston pin into the apertures under pressure or, preferably, by heating the piston before inserting the piston pin whereby when the piston cools off the piston pin is tightly held against endwise movement. When the engine is in operation, owing to the vibration and temperature changes, there is nevertheless a gradual creeping movement of the piston pin in one direction or the other. The soft end plugs 43 serve the purpose of limiting such movement to narrow limits and of preventing the piston pin from coming into contact with the cylinder walls, whereby the latter would be badly scored by the action of the hard piston pin during reciprocation of the piston.

It will be apparent from the foregoing description that certain advantages are present. The scoring of the cylinder walls is eliminated by attaching relatively soft plugs to the end of the piston which will prevent the hard iron piston pin coming in contact with the cylinder walls.

Another advantage of the present invention is in preventing the piston pin from wearing the bosses of the soft piston. The locating pin which projects into the open-ended groove of the piston pin will prevent the piston pin from turning and wearing the bosses.

A still further advantage is in providing an oil reservoir in the piston pin. By plugging the ends of the hollow piston pin an oil reservoir is formed within the pin and is adapted to supply oil for the bearing of the connecting rod through the passages described.

It will be apparent that with these foregoing advantages the construction and arrangements provide for the ready removal of the piston pin from the piston after the piston is removed from the cylinder. The open-ended groove will permit an endwise movement of the piston pin through the piston while the end plugs are of such a size as not to come in contact with and obstruct the passage of the locating pin through the groove.

While the forms of mechanisms herein shown and described constitute a preferred form of embodiment of the invention, it is to be understood that other forms might be adopted, all coming within the scope of the claims which follow.

What I claim is as follows:—

1. In a cylinder and piston construction, the combination with a cylinder; of a piston cooperating therewith, said piston provided with aligned apertures; a piston pin slidably mounted within said apertures; and pieces of material softer than the cylinder attached to the ends of the pin for preventing the ends of the pin engaging the cylinder walls while permitting movement of the pin through said apertures.

2. In a cylinder and piston construction, the combination with a cylinder; of a piston cooperating therewith, said piston provided with an aperture; a piston pin slidably mounted within said aperture; and a plug of soft material attached to the end of the pin for preventing the end of the pin engaging the cylinder wall while permitting movement of the pin through said aperture.

3. In a cylinder and piston construction the combination with a cylinder; of a piston cooperating therewith, said piston provided with an aperture; a piston pin slidably mounted within said aperture; and means for preventing turning of the piston pin while permitting movement of the pin endwise through said aperture; and a piece of material softer than the cylinder between the end of the piston pin and the cylinder wall.

4. In a cylinder and piston construction, the combination with a cylinder; of a piston cooperating therewith, said piston provided with an aperture; a piston pin slidably mounted within said aperture; and a piece of material softer than the cylinder between the end of the piston pin and the cylinder wall.

5. In a cylinder and piston construction, the combination with a cylinder; of a piston cooperating therewith, said piston provided with an aperture; a piston pin slidably mounted within said aperture; a pin and slot connection between the piston and piston pin for preventing the turning of the piston pin while permitting movement of the pin endwise through said aperture; and a piece of material softer than the cylinder attached to the end of the pin.

6. In a cylinder and piston construction, the combination with a cylinder; of a piston provided with an aperture; a hollow piston pin slidably mounted in said aperture; and means for closing the ends of the piston pin to form an oil reservoir within said hollow pin and to prevent the piston pin engaging the cylinder walls.

7. In a cylinder and piston construction, the combination with a cylinder; of a piston provided with an aperture; a hollow piston pin slidably mounted in said aperture; and pieces of material softer than the cylinder wall attached to the ends of the hollow piston pin for preventing the ends of the pin engaging the cylinder walls and adapted to form an oil reservoir within said hollow piston pin.

8. In a cylinder and piston construction, the combination with a cylinder; of a piston provided with an aperture; a hollow piston pin slidably mounted in said aperture; and a piece of material softer than the cylinder between the end of the piston pin and the cylinder wall and adapted to form an oil reservoir within said hollow piston pin.

9. In a cylinder and piston construction, the combination with a cylinder; of a piston provided with an aperture; a hollow piston pin slidably mounted in said aperture and provided with an opening in the wall thereof; of a connecting rod provided with a bearing adapted to cooperate with said piston pin and having an opening through the connecting rod and bearing in alignment with the opening in the piston pin; of pieces of material softer than the cylinder attached to the end of the hollow piston pin for preventing the ends of the pin engaging the cylinder walls and adapted to form an oil reservoir within said hollow piston pin.

10. A piston pin carrying at its end an abutment member of soft metal.

11. A piston pin carrying at its end an abutment member of metal softer than the cylinder wall adjacent the end of the piston pin.

In testimony whereof I affix my signature.

LESTER S. KEILHOLTZ.

Witnesses:
 HAZEL SOLLENBERGER,
 MILDRED PEARE.